(12) United States Patent
King et al.

(10) Patent No.: US 9,355,071 B2
(45) Date of Patent: May 31, 2016

(54) SYSTEM AND METHOD FOR MULTIVARIATE OUTLIER DETECTION

(71) Applicant: SAS Institute Inc., Cary, NC (US)

(72) Inventors: Julius Alton King, Cary, NC (US); Jin-Whan Jung, Chapel Hill, NC (US); John Clare Brocklebank, Raleigh, NC (US); Youngjin Park, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 640 days.

(21) Appl. No.: 13/782,192

(22) Filed: Mar. 1, 2013

(65) Prior Publication Data

US 2014/0249776 A1     Sep. 4, 2014

(51) Int. Cl.
*G06F 17/18* (2006.01)

(52) U.S. Cl.
CPC ............................ *G06F 17/18* (2013.01)

(58) Field of Classification Search
CPC ................ G06F 17/18; G06F 17/10–17/12; G06F 17/14–17/16
See application file for complete search history.

(56) References Cited

PUBLICATIONS

Semmar et al., Independent-Model Diagnostics for a Priori Identification and Interpretation of Outliers from a Full Pharmacokinetic Database: Correspondence Analysis, Mahalanobis Distance and Andrews Curves, 2008, J Pharmacokinet Pharmacodyn, vol. 35, pp. 159-183.*
Essannouni et al., "An Optimal and Statistically Robust Correlation Technique for Block Based Motion Estimation", ICME 2006, 1-4244-0367-7/06, pp. 233-236.
Pena et al., "Multivariate Outlier Detection and Robust Covariance Matrix Estimation", Department of Statistics and Econometrics, Madrid, Spain, Technometrics, Aug. 2001, vol. 43, No. 3, pp. 286-310.
P. Filzmoser, A Multivariate Outlier Detection Method, Department of Statistics and Probability Theory, Vienna, Austria, 2004, 5 pages.
Santos-Pereira, Detection of outliers in multivariate data: a method based on clustering and robust estimators, 2002, pp. 1-6.

* cited by examiner

*Primary Examiner* — Toan Le
(74) *Attorney, Agent, or Firm* — Bell & Manning, LLC

(57) ABSTRACT

A computer-implemented method of determining actions outside of a norm is provided. The method comprises: generating an actor state vector and a peer group state vector, wherein the actor state vector identifies a characteristic for an actor in each of a plurality of categories and the peer group state vector identifies a characteristic for a peer group in each of the plurality of categories, transforming the actor state vector into a first sampled wave series representation using a first wave series transformation, transforming the population state vector into a second sampled wave series representation using a second wave series transformation, and filtering the first sampled wave series representation and the second sampled wave series representation to identify a deviation of the first wave series representation from the second wave series representation in a phase or a magnitude.

100 Claims, 14 Drawing Sheets

Fig. 9A

| | △SPECIALTY | △SERVICE_PROVIDER_ID | ○CPT_11100 | ○CPT_17110 | ○CPT_96910 |
|---|---|---|---|---|---|
| 1 | DERM | 1 | 4.55% | 13.57% | 3.56% |
| 2 | DERM | 4 | 2.24% | 8.79% | |
| 3 | DERM | 5 | | 6.48% | 9.93% |
| 4 | DERM | 8 | 5.12% | 7.38% | |
| 5 | DERM | 10 | | 8.90% | |
| 6 | DERM | 13 | | 6.63% | 4.55% |
| 7 | DERM | 14 | 2.29% | | |
| 8 | DERM | 18 | 8.69% | 7.21% | |

Fig. 9B

| ○CPT_99202 | ○CPT_99203 | ○CPT_99212 | ○CPT_99213 | ○CPT_99214 | ○CPT_99241 | ○CPT_99242 |
|---|---|---|---|---|---|---|
| 32.55% | | 10.39% | 11.36% | | 5.69% | 17.32% |
| | 7.52% | 27.03% | 15.77% | | | |
| | | 6.51% | 34.44% | 6.75% | | |
| 19.97% | | | 36.32% | | | |
| | 9.17% | 5.00% | 27.67% | | | |
| | | 6.33% | 33.32% | 5.52% | | |
| | | | 43.45% | | | 9.92% |
| | | | 23.35% | | | |

| | PEER GROUP | PROVIDER ID | t | f | LOWER 95% CONFIDENCE LIMIT | PEER GROUP f | UPPER 95% CONFIDENCE LIMIT |
|---|---|---|---|---|---|---|---|
| 1 | DERM | 1 | -3.14159265 | -0.493891172 | -1.625043306 | -0.43381786 | 0.7574075859 |
| 2 | DERM | 1 | -3.078760797 | -0.531030816 | -1.085890546 | -0.249675289 | 0.5865399678 |
| 3 | DERM | 1 | -3.015928944 | -0.164373852 | -0.606472188 | 0.1518177427 | 0.9101076732 |
| 4 | DERM | 1 | -2.953097091 | 0.2855834072 | -0.662806908 | 0.4047791252 | 1.4723651589 |
| 5 | DERM | 1 | -2.890265238 | 0.4292906023 | -0.673685269 | 0.282744763 | 1.2391747949 |
| 6 | DERM | 1 | -2.827433385 | 0.1760104022 | -0.887752723 | -0.094234632 | 0.6992834596 |
| 7 | DERM | 1 | -2.764601532 | -0.19716993 | -1.296084921 | -0.375740663 | 0.5446035947 |
| 8 | DERM | 1 | -2.701769679 | -0.332177441 | -1.20736842 | -0.306515392 | 0.5943376361 |
| 9 | DERM | 1 | -2.638937826 | -0.138086139 | -0.79443965 | 0.0434834471 | 0.8814065443 |
| 10 | DERM | 1 | -2.576105973 | 0.1424997169 | -0.475155096 | 0.3517463695 | 1.1786478346 |
| 11 | DERM | 1 | -2.51327412 | 0.1985964139 | -0.43000087 | 0.4310448785 | 1.1120906276 |
| 12 | DERM | 1 | -2.450442267 | -0.032925081 | -0.80163447 | 0.0240270692 | 0.849688608 |
| 13 | DERM | 1 | -2.387610414 | -0.316446099 | -1.090387981 | -0.320898341 | 0.4485912882 |
| 14 | DERM | 1 | -2.324778561 | -0.367076791 | -1.089062054 | -0.404356208 | 0.2803496383 |
| 15 | DERM | 1 | -2.261946708 | -0.133978261 | -1.042411304 | -0.172054773 | 0.6983017575 |
| 16 | DERM | 1 | -2.199114855 | 0.1662744112 | -0.588031701 | 0.1695199056 | 0.9270715119 |
| 17 | DERM | 1 | -2.136283002 | 0.280703188 | -0.281797412 | 0.3476725317 | 0.9771424754 |
| 18 | DERM | 1 | -2.073451149 | 0.162878766 | -0.774650926 | 0.2492185061 | 1.2730879382 |
| 19 | DERM | 1 | -2.010619296 | -0.01678166 | -0.924843962 | -0.013869237 | 0.8971054882 |
| 20 | DERM | 1 | -1.947787443 | -0.079578273 | -0.718836184 | -0.227544079 | 0.2637480259 |

Fig. 10

|   | OUTLIER_TYPE | SERVICE_PROVIDER_ID |
|---|---|---|
| 1 | SHIFT | 1 |
| 2 | SHIFT | 14 |
| 3 | SHIFT | 18 |
| 4 | SHIFT | 4 |
| 5 | SHIFT | 8 |

Fig. 11

SYSTEM AND METHOD FOR MULTIVARIATE OUTLIER DETECTION

TECHNICAL FIELD

The technology described herein relates generally to computer-implemented systems and methods for data mining, and in particular, to computer implemented systems and methods for identifying outliers in a data set population.

BACKGROUND

Data mining can be used in various fields. Data mining may reveal information and insight into a data set.

SUMMARY

In accordance with the teachings provided herein, systems and methods are provided for identifying outliers in a data set population. In one example, a computer-implemented method of determining actions outside of a norm is provided. The method comprises transforming a state vector for an actor into a first sampled wave series representation, wherein the state vector identifies a characteristic for the actor in each of a plurality of categories. The method further comprises transforming a state vector for a population into a second sampled wave series representation, wherein the population state vector identifies a characteristic for the population. Additionally, the method comprises comparing the first sampled wave series representation and the second sampled wave series representation to identify a deviation of the first wave series representation from the second wave series representation in a phase or a magnitude, wherein actions outside of a norm are determined based on an identified deviation in a phase or in a magnitude.

These aspects and other embodiments may include one or more of the following features. The categories may comprise categories of actor actions and the characteristic for the actor may comprise a ratio of the number of actor actions in a specific category of actor actions over the sum total of actor actions in the plurality of categories. Each of the plurality of categories may comprise a specific medical procedure and the characteristic of the actor may comprise an actor's utilization percentage of a medical procedure. Each of the plurality of categories may comprise a spending category and the characteristic for the actor may comprise a spending characteristic. The operation of transforming a state vector for an actor into a first sampled wave series representation may comprise applying an Andrews' wave transformation to transform the actor state vector into the first sampled wave series representation. The operation of transforming a state vector for a population into a second sampled wave series representation may comprise applying an Andrews' wave transformation to transform the population state vector into the second sampled wave series representation. The first sampled wave series representation may comprise an alternating sine-cosine series representation and the second sampled wave representation may comprise an alternating sine-cosine series representation. The first sampled wave representation and the second sample wave representation may be whitened to generate a whitened first sampled wave representation and a whitened second sampled wave representation. The operation of comparing the first sampled wave representation and the second sampled wave representation may comprise comparing the whitened first sampled wave representation to the whitened second sampled wave representation. The operation of whitening may comprise filtering the whitened first sampled wave representation and the whitened second sampled wave representation to remove autoregressive and moving average affects. The operation of comparing may comprise determining a cross-correlation function between the actor series representation and the population series representation. The operation of comparing may further comprise determining if a deviation in the phase or the magnitude exists in the cross-correlation function that exceeds a threshold level.

In accordance with another example, a computer-implemented method of determining actions outside of a norm is provided. The method comprises performing a whitening operation on a sampled wave series representation of a state vector for an actor, wherein the actor state vector identifies a characteristic for the actor in each of a plurality of categories, and performing a whitening operation on a sampled wave series representation of a state vector for a population, wherein the population state vector identifies a characteristic for the population in a plurality of categories. The method further comprises determining a cross-correlation function between the actor series representation and the population series representation and determining if a deviation in a phase or a magnitude exists in the cross-correlation function that exceeds a threshold level, wherein actions outside of a norm are determined based on an identified deviation in the phase or in the magnitude exceeding the threshold level.

These aspects and other embodiments may include one or more of the following features. Performing a whitening operation on a sampled wave series representation of a state vector for an actor may comprise removing autoregressive and moving average affects. Performing a whitening operation on a sampled wave series representation of a state vector for a population may also comprise removing autoregressive and moving average affects. The sampled wave series representation of the state vector for the actor may comprise an alternating sine-cosine series representation and the sampled wave series representation of the state vector for the population may comprise an alternating sine-cosine series representation. The sampled wave series representation of the state vector for the actor may be generated using a first wave series transformation and the sampled wave series representation of the state vector for the population may be generated using a second wave series transformation. The first wave series transformation may comprise an Andrews' wave transformation. The second wave series transformation may also comprise an Andrews' wave transformation. A deviation in phase may represent a distribution of actions across the categories for the actor that differs more than a threshold amount from a distribution of actions for the population. A deviation in magnitude may represent a volume of actions in a particular category for the actor that differs by more than a threshold amount from the volume of actions that fall in the particular category for the population. The threshold amount for the deviation or magnitude may be based on a confidence interval associated with the whitened population series representation.

In another example, a computer-implemented method of determining actions outside of a norm is provided. The method comprises generating an actor state vector and a peer group state vector, wherein the actor state vector identifies a characteristic for an actor in each of a plurality of categories and the peer group state vector identifies a characteristic for a peer group in each of the plurality of categories, transforming the actor state vector into a first sampled wave series representation using a first wave series transformation, transforming the population state vector into a second sampled wave series representation using a second wave series transformation, and filtering the first sampled wave series representation and the second sampled wave series representation to identify a deviation of the first wave series representation from the second wave series representation in a phase or a magnitude, wherein actions outside of a norm are determined based on an identified deviation in a phase or in a magnitude.

These aspects and other embodiments may include one or more of the following features. The first sampled wave series representation may comprise an alternating sine-cosine series representation and the second sampled wave representation may comprise an alternating sine-cosine series representation. The first and second wave series transformations may comprise an Andrews' wave transformation. The operation of filtering the first sampled wave series representation and the second sampled wave series representation may comprise performing a whitening operation on the first sampled wave series representation and on the second sampled wave series representation. The operation of performing a whitening operation on the first sampled wave series representation and on the second sampled wave series representation may comprise removing autoregressive and moving average affects. The operation of filtering the first sampled wave series representation and the second sampled wave series representation may further comprise comparing the whitened first sampled wave series representation and the whitened second sampled wave series representation. The operation of comparing the whitened first sampled wave series representation and the whitened second sampled wave series representation may comprise determining a cross-correlation function between the whitened first sampled wave series representation and the whitened second sampled wave series representation. The operation of comparing the whitened first sampled wave series and the second sampled wave series may further comprise determining if a deviation in phase or magnitude exists in the cross-correlation function that exceeds a threshold level, wherein actions outside of a norm are determined based on an identified deviation in a phase or in a magnitude exceeding the threshold level. The state vector for an actor may be stored in a state vector data structure and the population state vector may be stored in a population state data structure. The population state data structure may include a record for each of a plurality of actors in the population including the actor. The record for the actor may include a field for each of the plurality of categories where the fields are for storage of the characteristic of the actor in each of the plurality of categories.

In yet another example, a computer-implemented system is provided for determining outliers in a data set. The computer-implemented system comprises one or more data processors for executing instructions, a transformation engine, and a comparison engine. The transformation engine comprises data processing instructions encoded on non transitory computer-readable media for configuring the one or more data processors to transform a state vector for an actor into a first sampled wave series representation, wherein the state vector identifies a characteristic for the actor in each of a plurality of categories. The transformation engine further comprises data processing instructions encoded on non transitory computer-readable media for configuring the one or more data processors to transform a state vector for a population into a second sampled wave series representation, wherein the population state vector identifies a characteristic for the population. The comparison engine comprises data processing instructions encoded on non transitory computer-readable media for configuring the one or more data processors to compare the first sampled wave series representation and the second sampled wave series representation to identify a deviation of the first wave series representation from the second wave series representation in a phase or a magnitude, wherein actions outside of a norm are determined based on an identified deviation in the phase or in the magnitude.

In another example, provided is a computer-implemented system for determining outliers in a data set comprising one or more data processors for executing instructions, a pre-whitening engine, and a comparison engine. The pre-whitening engine comprises data processing instructions encoded on non transitory computer-readable media for configuring the one or more data processors to perform a whitening operation on a sampled wave series representation of a state vector for an actor, wherein the actor state vector identifies a characteristic for the actor in each of a plurality of categories. The pre-whitening engine further comprises data processing instructions encoded on non transitory computer-readable media for configuring the one or more data processors to perform a whitening operation on a sampled wave series representation of a state vector for a population, wherein the population state vector identifies a characteristic for the population in a plurality of categories. The comparison engine comprises data processing instructions encoded on the non transitory computer-readable media for configuring the one or more data processors to determine a cross-correlation function between the actor series representation and the population series representation, and determine if a deviation in a phase or a magnitude exists in the cross-correlation function that exceeds a threshold level, wherein actions outside of a norm are determined based on an identified deviation in the phase or in the magnitude exceeding the threshold level.

In yet another example, provided is a computer-implemented system for determining outliers in a data set, comprising one or more data processors for executing instructions, a state vector transformation engine, a wave transformation engine, and a comparison engine. The state vector transformation engine comprises data processing instructions encoded on non transitory computer-readable media for configuring the one or more data processors to generate an actor state vector and a peer group state vector, wherein the actor state vector identifies a characteristic for an actor in each of a plurality of categories and the peer group state vector identifies a characteristic for a peer group in each of the plurality of categories. The wave transformation engine comprises data processing instructions encoded on the non transitory computer-readable media for configuring the one or more data processors to transform the actor state vector into a first sampled wave series representation using a first wave series transformation and transform the population state vector into a second sampled wave series representation using a second wave series transformation. The comparison engine comprises data processing instructions encoded on the non transitory computer-readable media for configuring the one or more data processors to filter the first sampled wave series representation and the second sampled wave series representation to identify a deviation of the first wave series representation from the second wave series representation in a phase or a magnitude, wherein actions outside of a norm are determined based on an identified deviation in the phase or in the magnitude.

In another example, a computer-program product for performing data mining operations on data is provided. The computer-program product is tangibly embodied in a machine-readable non-transitory storage medium and includes instructions configured to cause a data processing apparatus to transform a state vector for an actor into a first sampled wave series representation, wherein the state vector identifies a characteristic for the actor in each of a plurality of categories, transform a state vector for a population into a second sampled wave series representation, wherein the population state vector identifies a characteristic for the population, and compare the first sampled wave series representation and the second sampled wave series representation to identify a deviation of the first wave series representation from the second wave series representation in a phase or a magnitude, wherein actions outside of a norm are determined based on an identified deviation in the phase or in the magnitude.

According to another example, a computer-program product for performing data mining operations on data is provided. The computer-program product is tangibly embodied in a machine-readable non-transitory storage medium and includes instructions configured to cause a data processing apparatus to perform a whitening operation on a sampled wave series representation of a state vector for an actor, wherein the actor state vector identifies a characteristic for the actor in each of a plurality of categories, and perform a whitening operation on a sampled wave series representation of a state vector for a population, wherein the population state vector identifies a characteristic for the population in a plurality of categories. The instructions are further configured to cause a data processing apparatus to determine a cross-correlation function between the actor series representation and the population series representation and determine if a deviation in a phase or a magnitude exists in the cross-correlation function that exceeds a threshold level, wherein actions outside of a norm are determined based on an identified deviation in the phase or in the magnitude exceeding the threshold level.

In accordance with another example, provided is a computer-program product for performing data mining operations on data. The computer-program product is tangibly embodied in a machine-readable non-transitory storage medium and includes instructions configured to cause a data processing apparatus to generate an actor state vector and a peer group state vector, wherein the actor state vector identifies a characteristic for an actor in each of a plurality of categories and the peer group state vector identifies a characteristic for a peer group in each of the plurality of categories. The instructions are further configured to cause a data processing apparatus to transform the actor state vector into a first sampled wave series representation using a first wave series transformation, transform the population state vector into a second sampled wave series representation using a second wave series transformation, and filter the first sampled wave series representation and the second sampled wave series representation to identify a deviation of the first wave series representation from the second wave series representation in a phase or a magnitude, wherein actions outside of a norm are determined based on an identified deviation in the phase or in the magnitude.

BRIEF DESCRIPTION OF THE DRAWINGS

FIGS. 9A and 9B provide a screen shot that depicts an example population state vector.

FIG. 10 is a screen shot that depicts an example sampled wave representation.

FIG. 11 is a screen shot for an example implementation in which outliers are identified.

DETAILED DESCRIPTION

Figure 1:
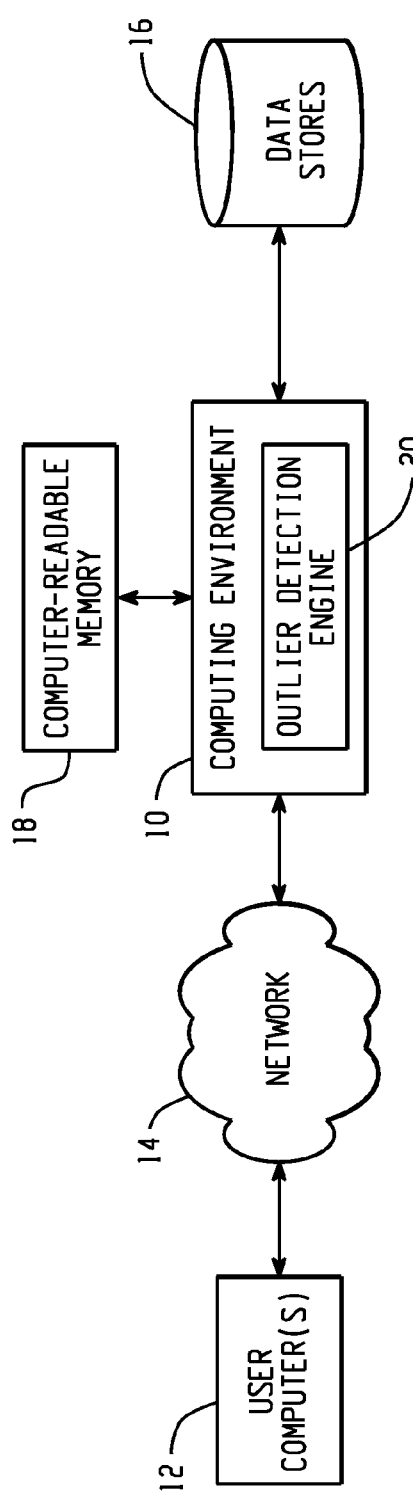
FIG. 1 is a block diagram depicting an example environment wherein users can interact with a computing environment that can perform data mining operations and identify outliers in a data set population.

FIG. 1 depicts at 10 a computing environment for processing data for many different types of applications, such as for scientific, technical or business applications. One or more user computers 12 can interact with the computing environment 10 through a number of ways, including a network 14. The illustrated computing environment 10 contains one or more servers or data processors (not shown). One or more data stores 16 may be coupled to the computing environment 10 to store data to be processed in the computing environment 10 as well as to store any intermediate or final data generated by the computing environment. Computer-readable memory 18 may also be coupled to the computing environment 10 for use by the data processors when processing data. An example application for the computing environment 10 involves the performance of data mining, in general, and outlier detection, in particular. An outlier detection engine 20 that executes within the computing environment 10 is provided in this example for detecting outliers in a data set.

Figure 2:
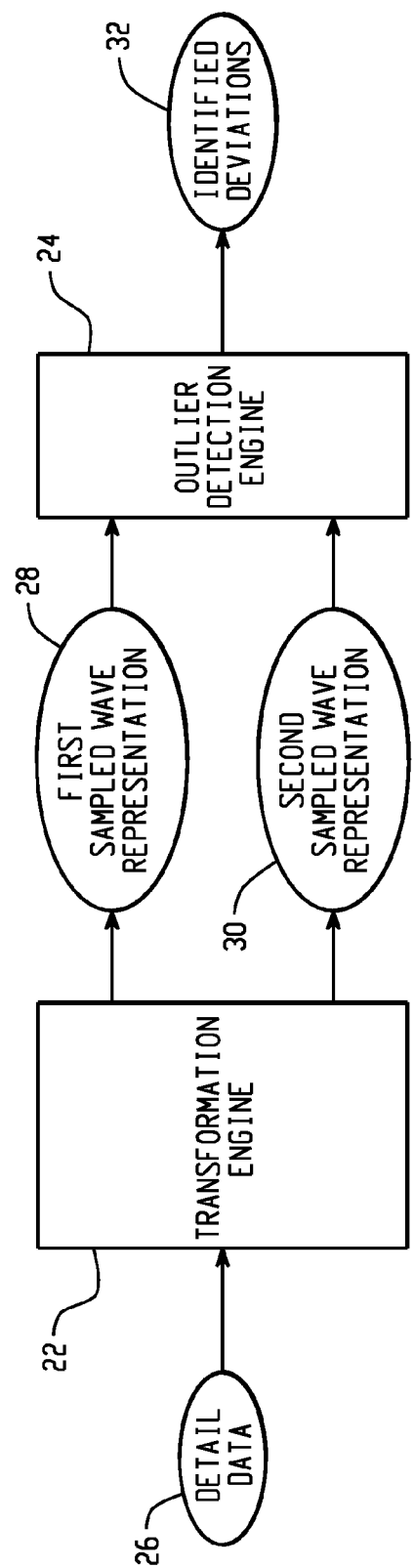
FIG. 2 is a block diagram depicting an example outlier detection engine.

FIG. 2 illustrates components for an example outlier detection engine that may execute using one or more servers or data processors of the computing environment 10 of FIG. 1. The example outlier detection engine includes a transformation engine 22 and an outlier detection filter 24 also executable using one or more servers or data processors of the computing environment 10 of FIG. 1. The transformation engine 22 receives detail data 26 from a data set and outputs a first sampled wave representation 28 and a second sampled wave representation 30 of subsets of the data in the data set. In this example, the first sampled wave representation 28 relates to a chosen characteristic of a particular target (or actor) having data in the data set. The second sampled wave representation 30 relates to the same chosen characteristic but for a larger population of actors of which the particular actor is a member. The outlier detection filter 24 receives the first sampled wave representation 28 and the second sampled wave representation 30, applies filter techniques and outputs information regarding identified deviations 32 by the target (or actor) from the population with respect to the chosen characteristic.

Figure 3:
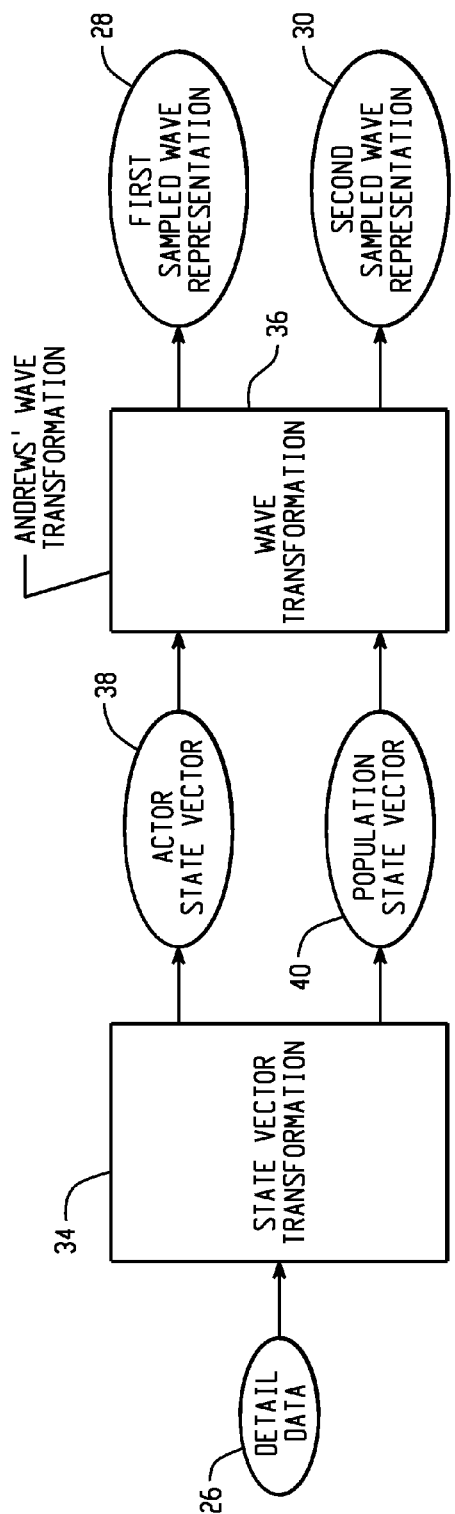
FIG. 3 is a block diagram depicting operations performed by an example transformation engine.

FIG. 3 is a block diagram depicting example operations performed by a transformation engine. The transformation engine in this example performs a state vector transformation operation 34 and a wave transformation operation 36. Detail data 26 from a data set undergoes a state vector transformation 34 to generate an actor (or target) state vector 38 and a population state vector 40. The actor state vector 38 relates to a chosen characteristic of a particular actor and the population state vector 40 relates to the same chosen characteristic but for a larger population of actors of which the particular actor is a member. Both the actor state vector 38 and the population state vector 40 undergo a wave transformation, such as a Fourier series based transformation, to generate, respectively, a first sampled wave representation 28 and a second sampled wave representation 30 of subsets of the data in the data set. In this example, an Andrews' wave transformation is performed.

Although the example shown in FIG. 3 illustrates the use of a single actor state vector and a population state vector, multiple actor state vectors could also be applied. Alternatively, a single population state vector could be applied without the use of a separate actor state vector wherein the state vector information for the actor could be contained in and derived from the population state vector.

Also, an actor state vector may be stored in an actor state data structure and a population state vector may be stored in a population state vector data structure. These data structures may be stored in computer-readable memory or data stores.

Figure 4:
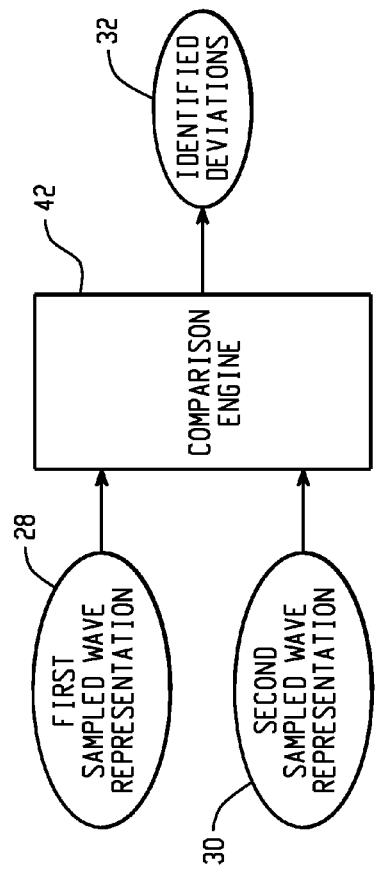
FIG. 4 is a block diagram depicting an example outlier detection filter.

FIG. 4 is a block diagram depicting an example outlier detection filter. In this example, a first sampled wave representation 28 and a second sampled wave representation 30 of subsets of the data in the data set are provided to a comparison engine 42, which compares the chosen characteristic of the actor with the same characteristic found in the population. If the chosen characteristic in the actor data deviates more than a predetermined threshold amount from the same characteristic in the population data, then the comparison engine 42 outputs data relating to the identified deviations 32.

Figure 5:
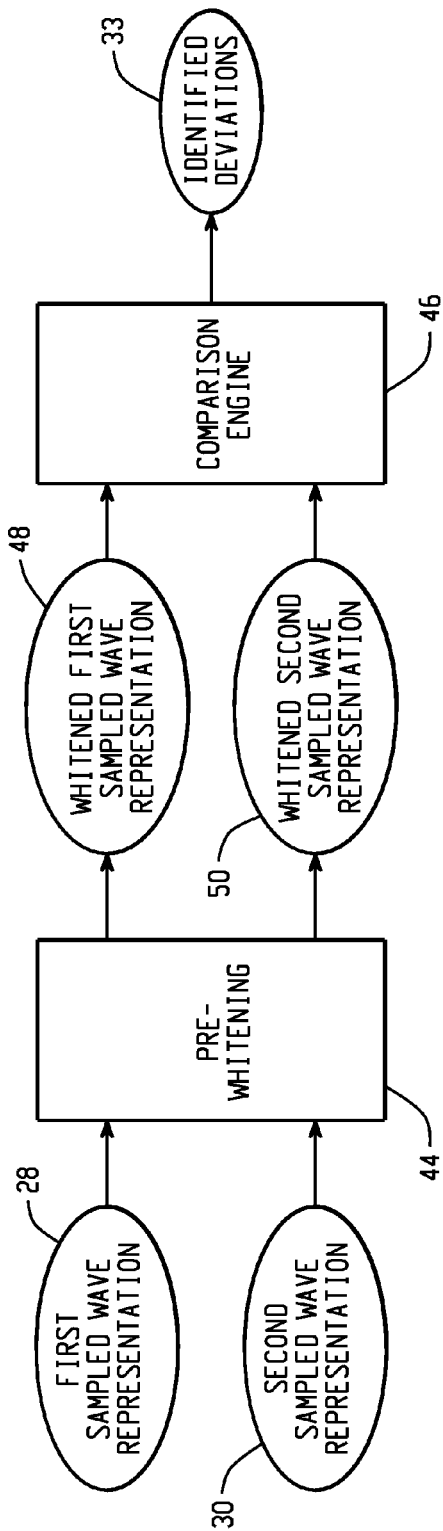
FIG. 5 is a block diagram depicting another example outlier detection filter.

FIG. 5 is a block diagram depicting another example outlier detection filter. In this example, autoregressive (AR) and Moving Average (MA) affects are removed leaving the white noise residual series, respectively, from a first sampled wave representation 28 and a second sampled wave representation 30 by a pre-whitening filter 44. The pre-whitening filter 44 outputs a whitened first sampled wave representation 48 and a second whitened sampled wave representation 50. The whitened first sampled wave representation 48 and a second whitened sampled wave representation 50 are provided to a comparison engine 46, which compares the chosen characteristic of the actor with the same characteristic found in the population. If the chosen characteristic in the actor data deviates more than a predetermined threshold amount from the same characteristic in the population data, then the comparison engine 46 outputs data relating to the identified deviations 33.

Figure 6A:
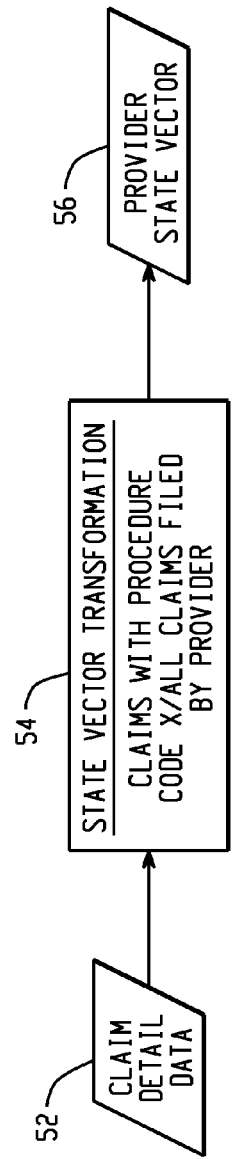
FIGS. 6A and 6B are process flow charts that depict example operations performed to create provider and population state vectors.
Figure 6B:
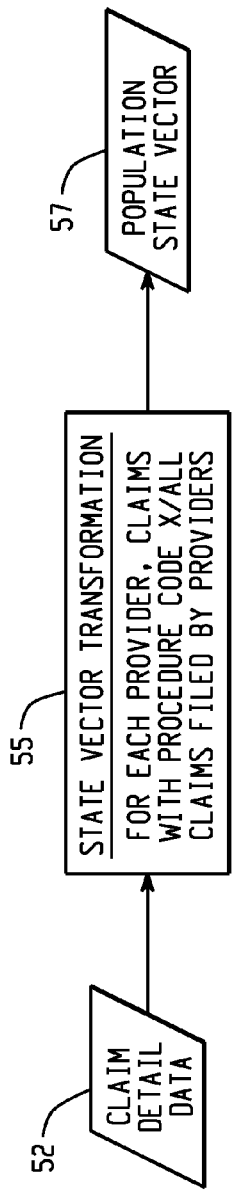

FIGS. 6A and 6B are process flow charts that depict example operations performed to create actor and population state vectors, respectively. In this example, the data set contains medical claims data. The process begins by determining a behavioral aspect of interest (i.e., a chosen characteristic) and calculating a normalized version of it. In this example, the behavioral aspect of interest is the utilization percentage for each procedure code in medical claims submitted by a particular medical provider. Population or peer groups can be defined in a number of ways such as in relation to the providers' specialty (e.g. Oncology or Pediatrics), for a given geographic region, or in another analytically driven way.

In the example of FIG. 6A, the claim detail data 52 can be transformed (operation 54) into a provider (i.e., actor) state vector 56 by calculating the utilization percentage for each procedure code for the provider. In this example, the transformation (operation 54) involves calculating the utilization percentage and transposing the data to create a data table. The calculation of the utilization percentage for each procedure code is accomplished by determining from the claim line data the number of unique claims with a particular procedure code for the provider and dividing that number by the number of unique claims for that provider. This data is then transposed to create a data table with one row for the provider that contains columns indicating the percent of claims filed with each procedure code.

In the example of FIG. 6B, the claim detail data 52 can also be transformed (operation 55) into a population state vector 57 by calculating the utilization percentage for each procedure code for each provider. In this example, the transformation (operation 55) also involves calculating the utilization percentage and transposing the data to create a data table. The calculation of the utilization percentage for each procedure code is accomplished by, for each provider, determining from the claim line data the number of unique claims with a particular procedure code and dividing that number by the number of unique claims for the provider. This data is then transposed to create a data table with one row per provider that contains columns indicating the percent of claims filed with each procedure code. In this example, the row in provider state vector 56 of FIG. 6A would be included in the population state vector 57.

Figure 7A:
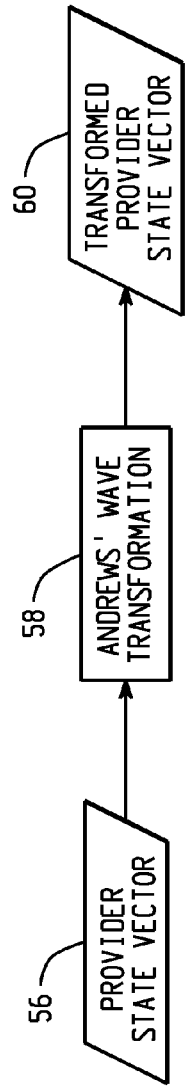
FIGS. 7A and 7B are process flow charts that depict example operations performed to create transformed provider and transformed population state vectors.
Figure 7B:
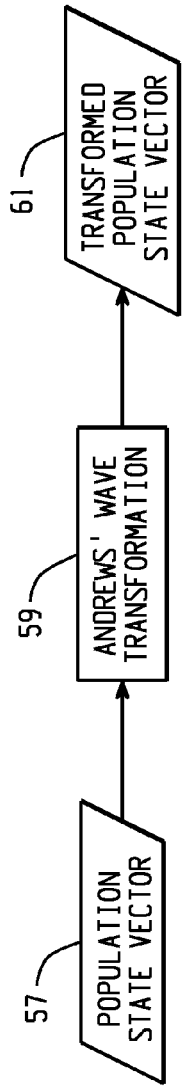

FIGS. 7A and 7B are process flow charts that depict example operations performed to create transformed provider and transformed population state vectors, respectively. In the example of FIG. 7A, the provider state vector 56 is transformed using an Andrews' Wave transformation (operation 58) to create a transformed provider state vector 60. Similarly, in the example of FIG. 7B, the population state vector 57 is transformed using an Andrews' Wave transformation (operation 59) to create a transformed population state vector 61. The Andrews' Wave transformation (as described in Everitt and Dunn, 1992) is based on a Fourier transformation of the multivariate data. Andrews' Wave is an alternating sine-cosine functional representation of the data, defined as:

$$f(t) = \frac{y_1}{\sqrt{2}} + y_2 * \sin(t) + y_3 * \cos(t) + y_4 * \sin(2t) + y_5 * \cos(2t) + \ldots$$

where the percentages in the provider state vector are the corresponding $y_i$'s in each component and the t variable varies from $-\pi$ to $\pi$. The magnitude of each percentage affects the frequency, amplitude and periodicity of the combined sine-cosine wave, giving a unique representation the behavior of each provider.

Figure 8:
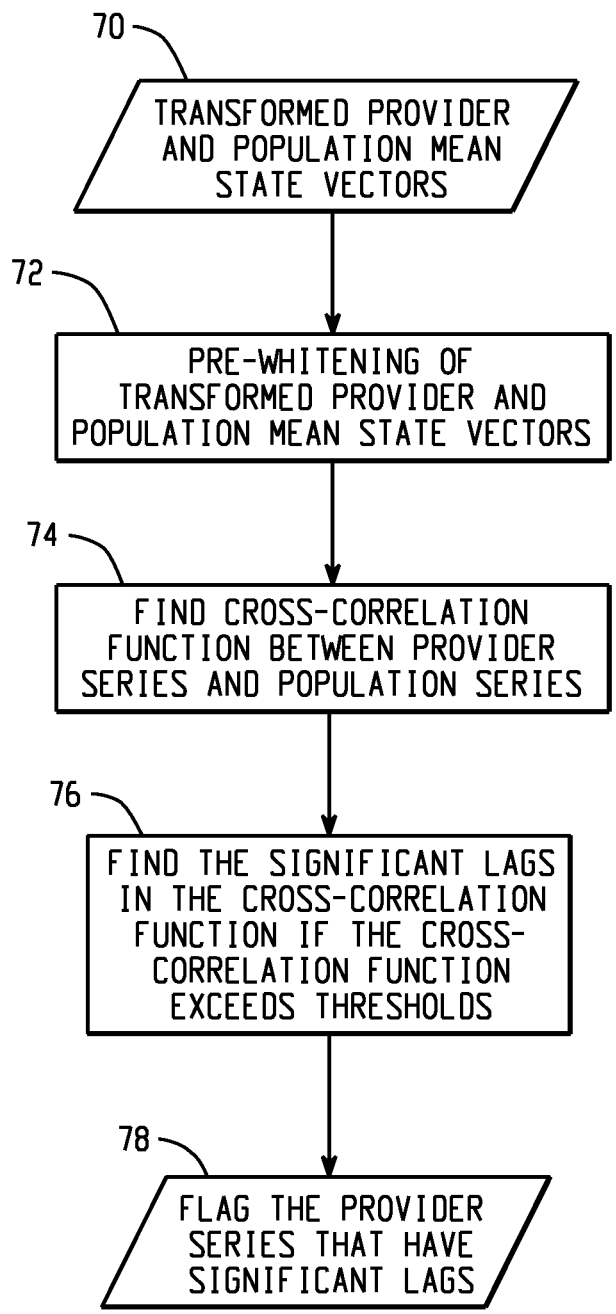
FIG. 8 is a process flow chart that depicts an example process for identifying outliers in a data set.

FIG. 8 is a process flow chart that depicts an example process for identifying outliers in a data set. Transformed provider and population mean state vectors 70 are examined to determine deviations in phase and/or magnitude between the series representing the provider and population. In this example, since the target (i.e., provider) series is auto-correlated, the direct cross-correlation function between the target series and its peer group (i.e., population) mean series can provide misleading results. To reduce the likelihood of misleading results, pre-whitening of both the transformed provider state vector and the transformed population mean state vector are performed (operation 72). Pre-whitening may involve removing autoregressive (AR) and Moving Average (MA) affects from the series leaving the white noise residual series.

Next, the cross-correlation function between the filtered provider series and the filtered population series is determined (operation 74). The cross-correlation function between the filtered target series and the filtered peer group mean series identifies deviation in phase and provides leading or lagging factors (collectively referred to as "distribution anomalies") between the two series. These distribution anomalies may represent a distribution of actions across the categories for the actor that differs more than a threshold amount from a distribution of actions for the population.

Next (at operation 76), the leading or lagging factors are examined to determine outliers. If the leading or lagging factors exceed a predetermined threshold, then a provider series having a leading or lagging factor that exceeds the threshold is flagged as an outlier (operation 78).

FIGS. 9A and 9B provide a screen shot that depicts an example population state vector. The example data relates to eight Dermatology providers. The example state vector shows for each provider, identified by its provider id, the percentage utilization for a number of dermatological provider codes.

FIG. 10 is a screen shot that depicts an example portion of a sampled wave representation. The example sampled wave representation was generated by transforming the data of FIG. 9 using Andrews' Wave Function to create the time series for each service provider.

FIG. 11 is a screen shot for an example implementation in which shifted outliers are identified. In this example, five service providers were found to have a shifted pattern from the peer group that exceeded predetermined thresholds.

Other outlier detection methods may also be utilized. Deviations in magnitude between the target and peer group series can be examined. For example, providers having series with magnitude values that are outside of the upper or lower confidence interval for the peer group can also be determined to be outliers, and any magnitude value that is outside the upper or lower confidence interval can be determined to be a magnitude anomaly. A magnitude anomaly may represent a volume of actions in a particular category for the actor that differs by more than a threshold amount from the volume of actions that fall in the particular category for the population. This type of outlier could be classified as a non-shifted outlier.

Figure 12:
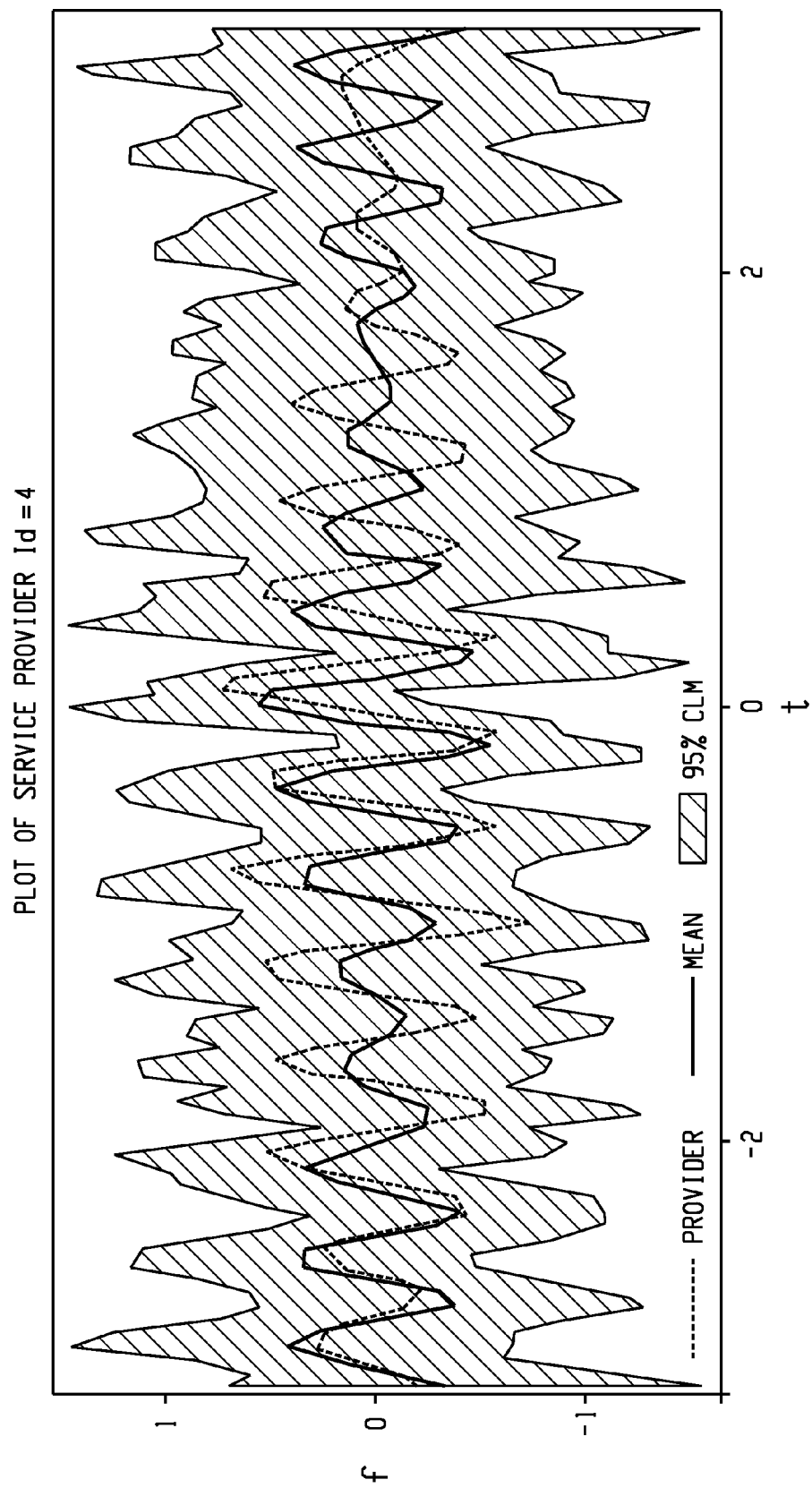
FIG. 12 is an example plot that illustrates that a particular provider's data is an outlier in the data set.

FIG. 12 is an example plot that illustrates that a particular provider's data is an outlier in the data set. This plot shows that the provider series falls within the 95% confidence limits but is shifted in phase from the peer group at various points and is therefore a shifter outlier but not a non-shifted outlier.

Figure 13:
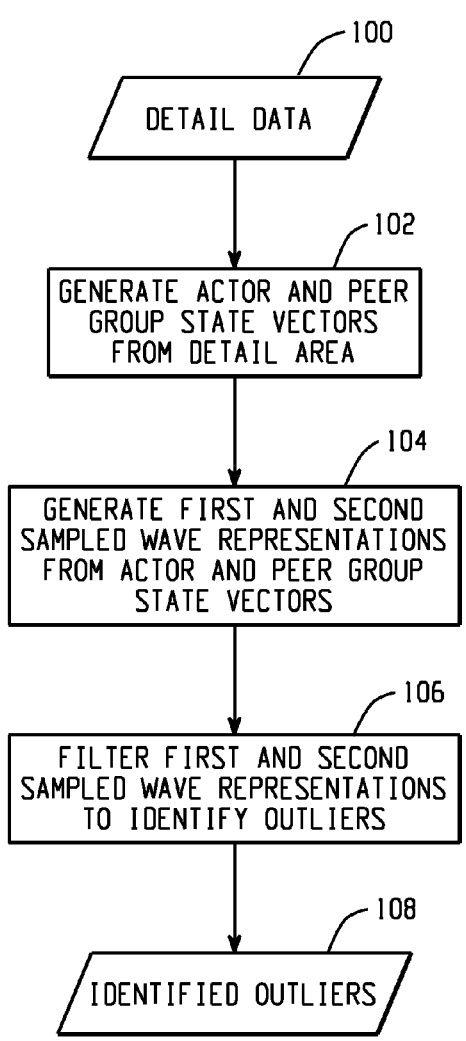
FIGS. 13-17 are process flow charts that depict example processes for identifying outliers in a data set.

FIG. 13 is a process flow chart that depicts an example process for identifying outliers in a data set. Data processing operations are performed on detail data 100 to generate actor and peer group state vectors (operation 102). Wave transformation operations are performed on each of the actor state vector and the peer group state vector to generate, respectively, first sampled wave series representations and second sampled wave series representations (operation 104). The first sampled wave series representations and the second sampled wave series representations are compared using filtering techniques to identify outliers 108 in the data (operation 106).

Figure 14:
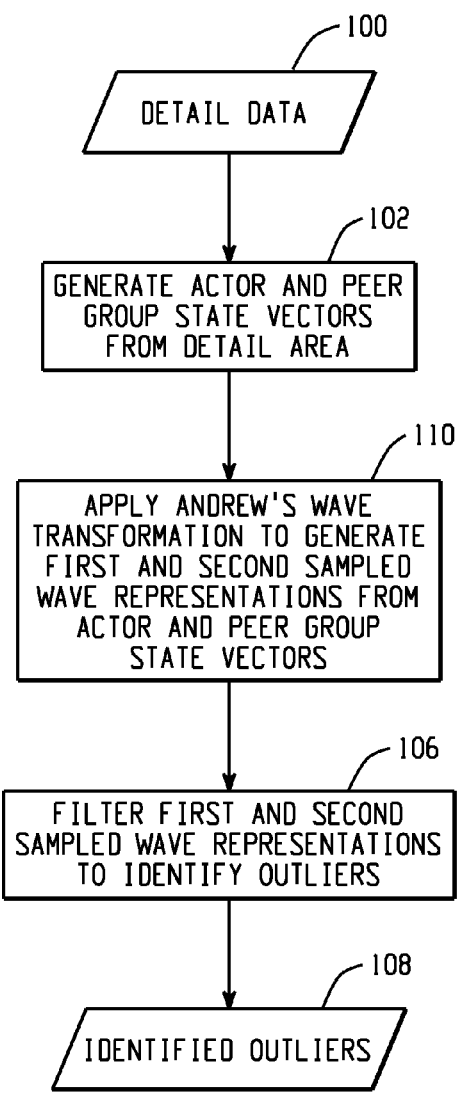

FIG. 14 is a process flow chart that depicts another example process for identifying outliers in a data set. Data processing operations are performed on detail data 100 to generate actor and peer group state vectors (operation 102). Wave transformation operations are performed on each of the actor state vector and the peer group state vector to generate, respectively, first sampled wave series representations and second sampled wave series representations. In this example the type of wave transformation applied is an Andrews' wave transformation (operation 110). The first sampled wave series representations and the second sampled wave series representations are compared using filtering techniques to identify outliers 108 in the data (operation 106).

Figure 15:
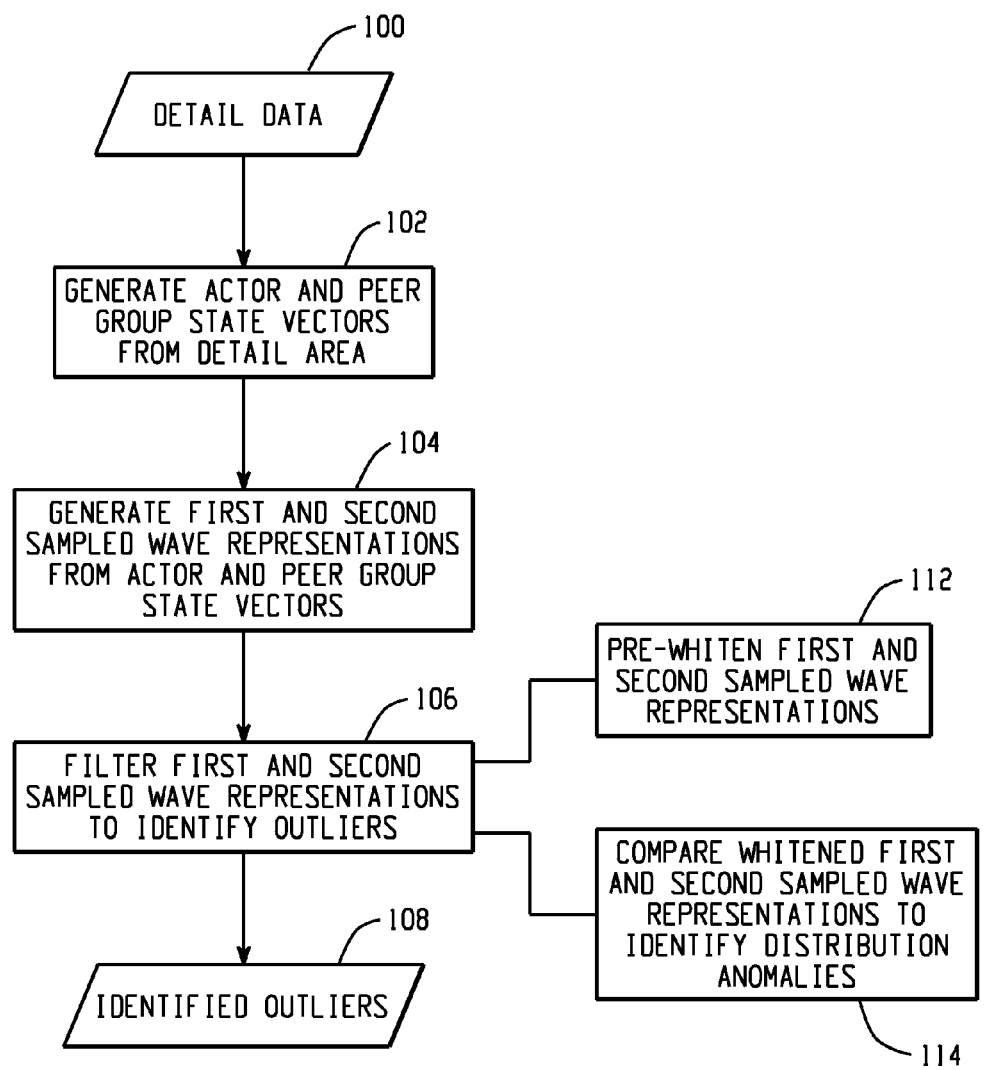

FIG. 15 is a process flow chart that depicts yet another example process for identifying outliers in a data set. Data processing operations are performed on detail data 100 to generate actor and peer group state vectors (operation 102). Wave transformation operations are performed on each of the actor state vector and the peer group state vector to generate, respectively, first sampled wave series representations and second sampled wave series representations (operation 104). Filtering techniques are applied to the first sampled wave series representations and the second sampled wave series representations to identify outliers 108 in the data (operation 106). In this example, the filtering techniques include pre-whitening the first and second sampled wave series representations using filtering techniques (operation 112). After pre-whitening, the whitened first sampled wave series representations and the whitened second sampled wave series representations are compared using filtering techniques to identify outliers 108 in the data (operation 114).

Figure 16:
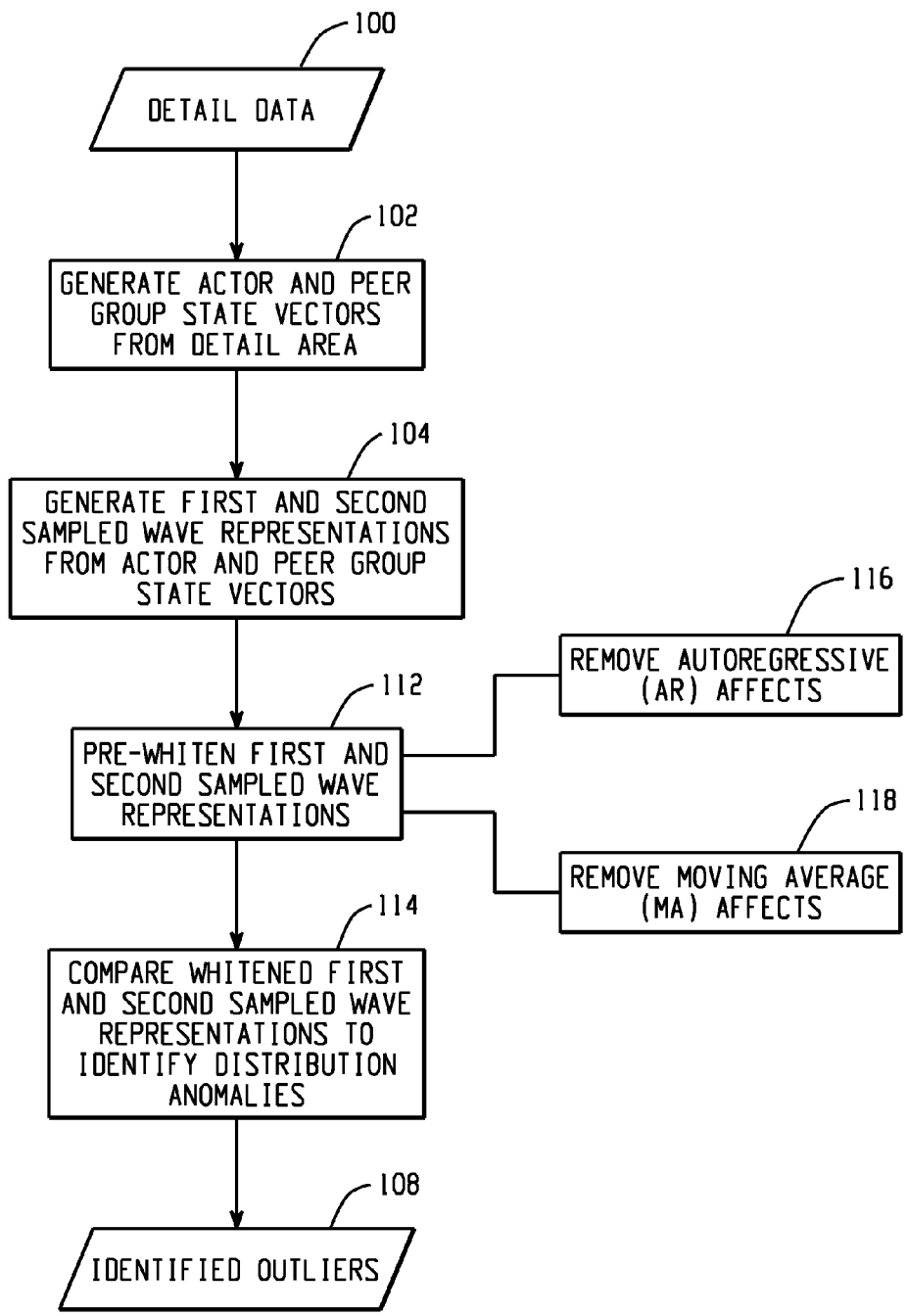

FIG. 16 is a process flow chart that depicts another example process for identifying outliers in a data set. Data processing operations are performed on detail data 100 to generate actor and peer group state vectors (operation 102). Wave transformation operations are performed on each of the actor state vector and the peer group state vector to generate, respectively, first sampled wave series representations and second sampled wave series representations (operation 104). Filtering techniques are applied to the first sampled wave series representations and the second sampled wave series representations. The filtering techniques include pre-whitening the first and second sampled wave series representations (operation 112). In this example, the pre-whitening involves removing autoregressive affects (operation 116) and removing moving average affects (operation 118). After pre-whitening, the whitened first sampled wave series representations and the whitened second sampled wave series representations are compared using filtering techniques to identify outliers 108 in the data (operation 114).

Figure 17:
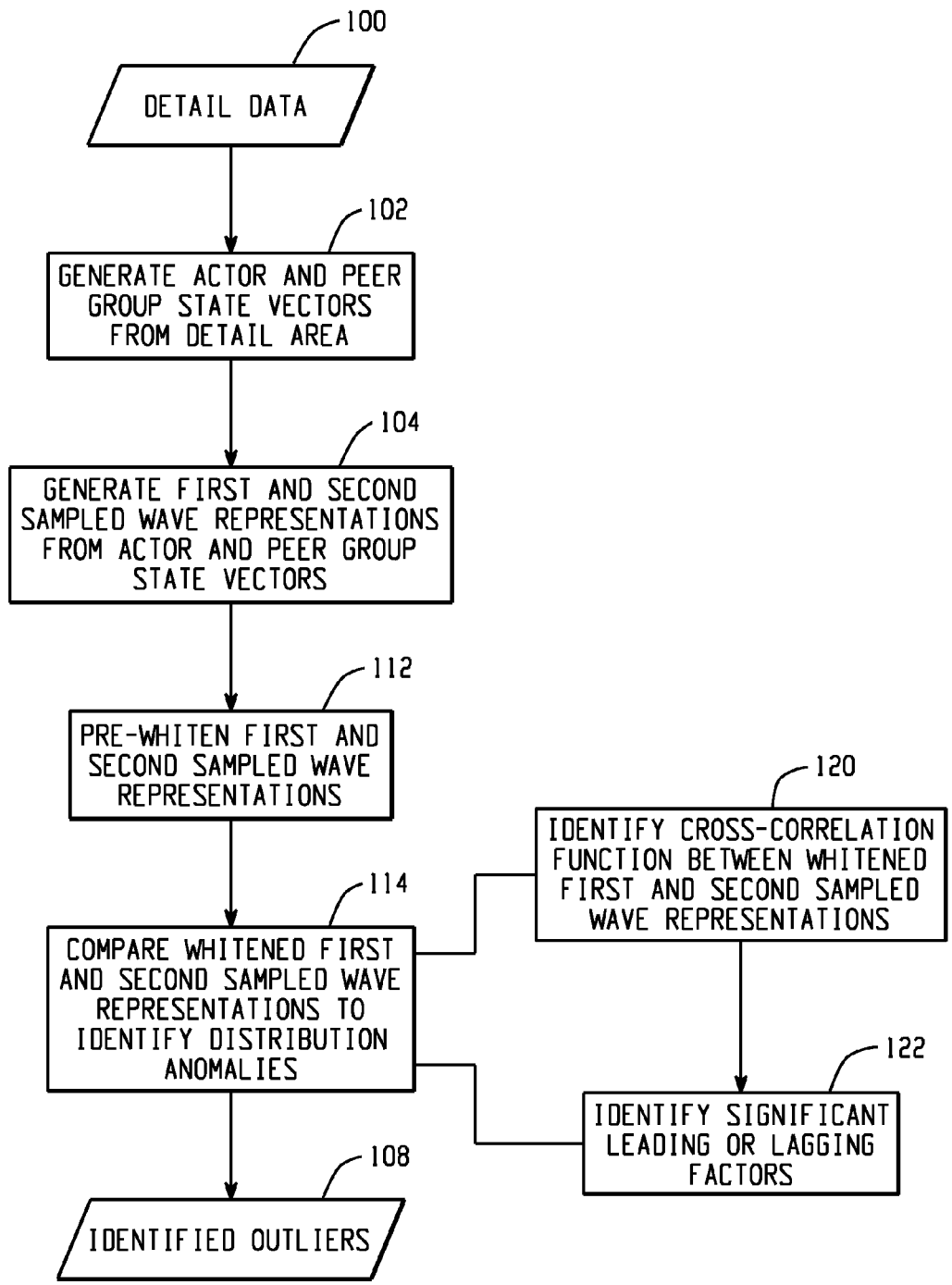

FIG. 17 is a process flow chart that depicts an additional example process for identifying outliers in a data set. Data processing operations are performed on detail data 100 to generate actor and peer group state vectors (operation 102). Wave transformation operations are performed on each of the actor state vector and the peer group state vector to generate, respectively, first sampled wave series representations and second sampled wave series representations (operation 104). Filtering techniques are applied to the first sampled wave series representations and the second sampled wave series representations. The filtering techniques include pre-whitening the first and second sampled wave series representations (operation 112). After pre-whitening, the whitened first sampled wave series representations and the whitened second sampled wave series representations are compared using filtering techniques to identify outliers 108 in the data (operation 114) In this example, the comparing using filtering techniques involves identifying the cross-correlation function between the whitened first sampled wave series representations and the whitened second sampled wave series representations (operation 120) and identifying significant leading or lagging factors (operation 122).

In some implementations of the present disclosure, fraudulent, wasteful, or abusive behavior committed by providers of services can be detected. Individually, aspects of a providers' billing behavior may not be anomalous, however when evaluated together (in a multivariate fashion) they may show that the provider is billing in a way that warrants investigation.

Using Andrews' wave function on aggregated billing data can condense this information into a provider "signature". In some implementations, each provider's "signature" can be analyzed against a peer group, or group of providers who provide similar services, to detect anomalous billing patterns. Such an automatic method of quantifying multiple aspects of a providers billing behavior and comparing it to normal behavior may help in detecting multivariate outlier behavior among a large numbers of providers.

Other implementations may include detecting abnormal activities relating to credit cards and banking accounts. Credit companies and banks may be able to reduce their losses by detecting abnormal behavior sooner using outlier detection systems and methods disclosed herein.

According to one example, outlier detection can be automatically performed to determine suspicious or fraudulent behavior. After a target series has had autoregressive (AR) and Moving Average (MA) affects removed, leaving only the white noise residual series, the peer group mean series is filtered with the same model. The cross-correlation functions between the filtered target series and the filtered peer group mean series provide leading or lagging factors between the two series. Based on manually set thresholds the degree of suspicious and potentially fraudulent behavior can be determined automatically.

According to another example, an outlier detection method may implement the following operations: (1) transform a provider state vector; (2) pre-whiten the transformed provider state vector; (3) apply the provider model to the mean state vector for the peer group; (4) find cross-correlation functions between the provider series and the peer group series; (5) find significant lags in the cross-correlation functions if the cross-correlation functions exceed thresholds; and (6) finds the target series values that have significant lags.

Referring back to FIG. 1, depicted is an example system that may be used to identify outliers in a data set. Although FIG. 1 depicts an example client/server environment, systems and methods described herein could also be implemented in a standalone environment.

Figure 18:
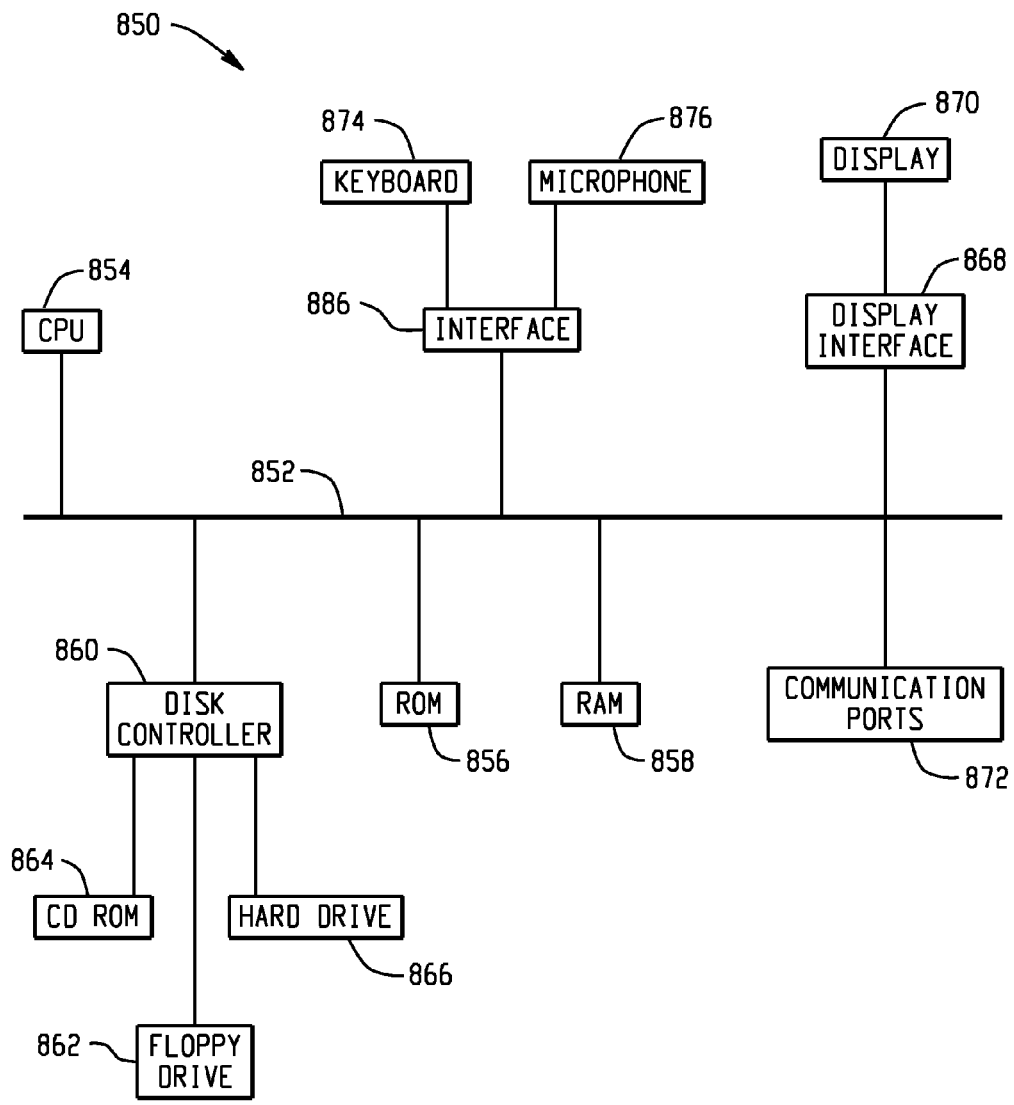
FIG. 18 is a block diagram of example hardware for either standalone or client/server computer architecture.

FIG. 18 shows a block diagram of example hardware for either standalone or client/server computer architecture 850 that may be used to contain and/or implement the program instructions of system embodiments of the present disclosure. A bus 852 may connect the other illustrated components of the hardware. A processing system 854 labeled CPU (central processing unit) (e.g., one or more computer processors), may perform calculations and logic operations to execute a program. A processor-readable storage medium, such as read only memory (ROM) 856 and random access memory (RAM) 858, may be in communication with the processing system 854 and may contain one or more programming instructions for performing an index join operation. Optionally, program instructions may be stored on a computer readable storage medium such as a magnetic disk, optical disk, recordable memory device, flash memory, or other physical storage medium. Computer instructions may also be communicated to other systems, components or devices.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processing system 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 874, or other input device 876, such as a microphone, remote control, pointer, mouse and/or joystick.

The patentable scope of the described subject matter may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of determining actions outside of a norm, comprising:
   transforming, by a processing system, a state vector for an actor into a first sampled wave series representation, wherein the state vector identifies a characteristic for the actor in each of a plurality of categories;
   defining, by the processing system, a population that includes a plurality of actors;

transforming, by the processing system, a state vector for the defined population into a second sampled wave series representation, wherein the defined population state vector identifies the characteristic for the population, wherein the second sampled wave series representation is a single wave series representation for the plurality of actors;

comparing, by the processing system, the first sampled wave series representation and the second sampled wave series representation to identify a deviation of the first wave series representation from the second wave series representation in a phase or a magnitude;

identifying, by the processing system, an action outside of a norm based on the identified deviation in the phase or in the magnitude; and outputting, by the processing system, information regarding the identified action outside of the norm.

2. The computer-implemented method of claim 1, wherein the population includes the actor.

3. The computer-implemented method of claim 1, wherein the plurality of categories comprise categories of actor actions and wherein the characteristic for the actor comprises a ratio of the number of actor actions in a specific category of actor actions over a sum total of actor actions in the plurality of categories.

4. The computer-implemented method of claim 1, wherein each of the plurality of categories comprises a specific medical procedure.

5. The computer-implemented method of claim 4, wherein the characteristic for the actor comprises an actor's utilization percentage of a medical procedure.

6. The computer-implemented method of claim 4, wherein the characteristic for the population comprises an actor's utilization percentage of a medical procedure.

7. The computer-implemented method of claim 1, wherein the actor comprises a medical provider.

8. The computer-implemented method of claim 7, wherein the population comprises a plurality of providers in a medical specialty.

9. The computer-implemented method of claim 7, wherein the population comprises a plurality of medical providers in a geographic region.

10. The computer-implemented method of claim 1, wherein each of the plurality of categories comprises a spending category.

11. The computer-implemented method of claim 10, wherein the characteristic for the actor comprises a spending characteristic within a category and the characteristic for the population comprises the spending characteristic within the category.

12. The computer-implemented method of claim 1, wherein transforming a state vector for an actor into a first sampled wave series representation comprises applying an Andrews' wave transformation to transform the actor state vector into the first sampled wave series representation.

13. The computer-implemented method of claim 12, wherein transforming a state vector for the defined population into a second sampled wave series representation comprises applying an Andrews' wave transformation to transform the defined population state vector into the second sampled wave series representation.

14. The computer-implemented method of claim 1, wherein the first sampled wave series representation comprises an alternating sine-cosine series representation.

15. The computer-implemented method of claim 14, wherein the second sampled wave representation comprises a second alternating sine-cosine series representation.

16. The computer-implemented method of claim 1, further comprising whitening the first sampled wave representation and the second sample wave representation to generate a whitened first sampled wave representation and a whitened second sampled wave representation.

17. The computer-implemented method of claim 16, wherein said comparing the first sampled wave representation and the second sampled wave representation comprises comparing the whitened first sampled wave representation to the whitened second sampled wave representation.

18. The computer-implemented method of claim 16, wherein whitening comprises filtering the whitened first sampled wave representation and the whitened second sampled wave representation to remove autoregressive and moving average affects.

19. The computer-implemented method of claim 1, wherein comparing further comprises determining a cross-correlation function between the first sampled wave representation and the second sampled wave representation.

20. The computer-implemented method of claim 19, wherein the deviation in the phase or the magnitude is identified when a value of the cross-correlation function exceeds a threshold level.

21. A computer-implemented method of determining actions outside of a norm, comprising:

performing, by a processing system, a whitening operation on a sampled wave series representation of a state vector for an actor, wherein the actor state vector identifies a characteristic for the actor in each of a plurality of categories;

performing, by the processing system, a whitening operation on a sampled wave series representation of a state vector for a population, wherein the population state vector identifies a characteristic for the population in the plurality of categories;

determining, by the processing system, a cross-correlation function between the whitened actor series representation and the whitened population series representation;

identifying, by the processing system, a deviation in a phase or a magnitude exists in when a value of the determined cross-correlation function exceeds a threshold level;

identifying, by the processing system, an action outside of a norm based on the identified deviation in the phase or in the magnitude; and outputting, by the processing system, information regarding the identified action outside of the norm.

22. The computer-implemented method of claim 21 wherein performing a whitening operation on a sampled wave series representation of a state vector for an actor and on a sampled wave series representation of a state vector for a population comprises:

removing autoregressive affects; and
removing moving average affects.

23. The computer-implemented method of claim 21, wherein the sampled wave series representation of the state vector for the actor comprises an alternating sine-cosine series representation and the sampled wave series representation of the state vector for the population comprises a second alternating sine-cosine series representation.

24. The computer-implemented method of claim 21 wherein the sampled wave series representation of the state vector for the actor was generated using a first wave series transformation.

25. The computer-implemented method of claim 24 wherein the first wave series transformation comprises an Andrews' wave transformation.

26. The computer-implemented method of claim 21 wherein the sampled wave series representation of the state vector for the population was generated using a second wave series transformation.

27. The computer-implemented method of claim 26 wherein the second wave series transformation comprises an Andrews' wave transformation.

28. The computer-implemented method of claim 21, wherein a deviation in the phase represents a distribution of actions across the categories for the actor that differs more than a threshold amount from a distribution of actions for the population.

29. The computer-implemented method of claim 21, wherein a deviation in the magnitude represents a volume of actions in a particular category for the actor that differs by more than a threshold amount from the volume of actions that fall in the particular category for the population.

30. The computer-implemented method of claim 29, wherein the threshold amount is based on a confidence interval associated with the whitened population series representation.

31. A computer-implemented method of determining actions outside of a norm, comprising:
    defining, by a processing system, a population that includes a plurality of actors;
    generating, by the processing system, an actor state vector and a population state vector, wherein the actor state vector identifies a characteristic for an actor in each of a plurality of categories and the population state vector identifies a characteristic for the defined population in each of the plurality of categories;
    transforming, by the processing system, the actor state vector into a first sampled wave series representation using a first wave series transformation;
    transforming, by the processing system, the population state vector into a second sampled wave series representation using a second wave series transformation, wherein the second sampled wave series representation is a single wave series representation for the plurality of actors;
    filtering, by the processing system, the first sampled wave series representation and the second sampled wave series representation to identify a deviation of the first wave series representation from the second wave series representation in a phase or a magnitude;
    identifying, by the processing system, an action outside of a norm based on the identified deviation in the phase or in the magnitude; and
    outputting, by the processing system, information regarding the identified action outside of the norm.

32. The computer-implemented method of claim 31, wherein the first sampled wave series representation comprises an alternating sine-cosine series representation and the second sampled wave representation comprises a second alternating sine-cosine series representation.

33. The computer-implemented method of claim 31 wherein each of the first and second wave series transformations comprises an Andrews' wave transformation.

34. The computer-implemented method of claim 31 wherein filtering the first sampled wave series representation and the second sampled wave series representation comprises:
    performing a whitening operation on the first sampled wave series representation and on the second sampled wave series representation.

35. The computer-implemented method of claim 34 wherein performing a whitening operation on the first sampled wave series representation and on the second sampled wave series representation comprises:
    removing autoregressive affects; and
    removing moving average affects.

36. The computer-implemented method of claim 34 wherein filtering the first sampled wave series representation and the second sampled wave series representation further comprises:
    comparing the whitened first sampled wave series representation and the whitened second sampled wave series representation.

37. The computer-implemented method of claim 36 wherein comparing the whitened first sampled wave series representation and the whitened second sampled wave series representation comprises:
    determining a cross-correlation function between the whitened first sampled wave series representation and the whitened second sampled wave series representation; and
    identifying the deviation in the phase or the magnitude when a value of the determined cross-correlation function exceeds a threshold level.

38. The computer-implemented method of claim 31, wherein the actor state vector is stored in a state vector data structure and wherein the population state vector is stored in a population state data structure.

39. The computer-implemented method of claim 38, wherein the population state data structure includes a record for each of the plurality of actors in the population including the actor.

40. The computer-implemented method of claim 39, wherein the record for the actor includes a field for each of the plurality of categories and the fields are for storage of the characteristic of the actor in each of the plurality of categories.

41. A system for determining outliers in a data set, comprising:
    one or more data processors for executing instructions;
    data processing instructions encoded on non-transitory computer-readable media for configuring the one or more data processors to:
        transform a state vector for an actor into a first sampled wave series representation, wherein the state vector identifies a characteristic for the actor in each of a plurality of categories;
        define a population that includes a plurality of actors;
        transform a population state vector for the defined population into a second sampled wave series representation, wherein the population state vector identifies the characteristic for the population, wherein the second sampled wave series representation is a single wave series representation for the plurality of actors;
        compare the first sampled wave series representation and the second sampled wave series representation to identify a deviation of the first wave series representation from the second wave series representation in a phase or a magnitude;
        identify an action outside of a norm based on the identified deviation in the phase or in the magnitude; and
        output information regarding the identified action outside of the norm.

42. The system of claim 41, wherein each of the plurality of categories comprises a specific procedure.

43. The system of claim 42, wherein the characteristic for the actor comprises a utilization percentage of a procedure.

44. The system of claim 41, wherein the data processing instructions for configuring the one or more data processors to transform a state vector for an actor into a first sampled wave series representation comprise applying an Andrews' wave transformation to transform the actor state vector into the first sampled wave series representation.

45. The system of claim 44, wherein the data processing instructions for configuring the one or more data processors to transform a population state vector for the defined population into a second sampled wave series representation comprise applying an Andrews' wave transformation to transform the population state vector into the second sampled wave series representation.

46. The system of claim 41, wherein the first sampled wave series representation comprises an alternating sine-cosine series representation.

47. The system of claim 46, wherein the second sampled wave series representation comprises a second alternating sine-cosine series representation.

48. The system of claim 41, further comprising data processing instructions for configuring the one or more data processors to whiten the first sampled wave series representation and the second sample wave series representation to generate a whitened first sampled wave representation and a whitened second sampled wave representation.

49. The system of claim 48, wherein the data processing instructions for configuring the one or more data processors to compare the first sampled wave series representation and the second sampled wave series representation comprise comparing the whitened first sampled wave representation to the whitened second sampled wave representation.

50. The system of claim 48, wherein the data processing instructions for configuring the one or more data processors to whiten comprise data processing instructions for configuring the one or more data processors to filter the whitened first sampled wave representation and the whitened second sampled wave representation to remove autoregressive and moving average affects.

51. A system for determining outliers in a data set, comprising:
one or more data processors for executing instructions;
data processing instructions encoded on non-transitory computer-readable media for configuring the one or more data processors to:
perform a whitening operation on a sampled wave series representation of a state vector for an actor, wherein the actor state vector identifies a characteristic for the actor in each of a plurality of categories;
perform a whitening operation on a sampled wave series representation of a state vector for a population, wherein the population state vector identifies the characteristic for the population in the plurality of categories;
determine a cross-correlation function between the whitened actor series representation and the whitened population series representation;
identify a deviation in a phase or a magnitude when a value of the determined cross-correlation function exceeds a threshold level;
identify an action outside of a norm based on the identified deviation in the phase or in the magnitude; and
output information regarding the identified action outside of the norm.

52. The system of claim 51 wherein the data processing instructions for configuring the one or more data processors to perform a whitening operation on a sampled wave series representation of a state vector for an actor and on a sampled wave series representation of a state vector for a population comprise data processing instructions for configuring the one or more data processors to:
remove autoregressive affects; and
remove moving average affects.

53. The system of claim 51, wherein the sampled wave series representation of the state vector for the actor comprises an alternating sine-cosine series representation and the sampled wave series representation of the state vector for the population comprises a second alternating sine-cosine series representation.

54. The system of claim 51 wherein the sampled wave series representation of the state vector for the actor was generated using a first wave series transformation.

55. The system of claim 54 wherein the first wave series transformation comprises an Andrews' wave transformation.

56. The system of claim 51 wherein the sampled wave series representation of the state vector for the population was generated using a second wave series transformation.

57. The system of claim 56 wherein the second wave series transformation comprises an Andrews' wave transformation.

58. The system of claim 51, wherein the deviation in the phase represents a distribution of actions across the plurality of categories for the actor that differs more than a threshold amount from a distribution of actions for the population.

59. The system of claim 51, wherein the deviation in the magnitude represents a volume of actions in a particular category for the actor that differs by more than a threshold amount from the volume of actions that fall in the particular category for the population.

60. The system of claim 59, wherein the threshold amount is based on a confidence interval associated with the whitened population series representation.

61. A system for determining outliers in a data set, comprising:
one or more data processors for executing instructions;
data processing instructions encoded on non-transitory computer-readable media for configuring the one or more data processors to:
define a population that includes a plurality of actors;
generate an actor state vector and a population state vector, wherein the actor state vector identifies a characteristic for an actor in each of a plurality of categories and the population state vector identifies a characteristic for the defined population in each of the plurality of categories;
transform the actor state vector into a first sampled wave series representation using a first wave series transformation;
transform the population state vector into a second sampled wave series representation using a second wave series transformation, wherein the second sampled wave series representation is a single wave series representation for the plurality of actors;
filter the first sampled wave series representation and the second sampled wave series representation to identify a deviation of the first wave series representation from the second wave series representation in a phase or a magnitude;
identify an action outside of a norm based on the identified deviation in the phase or in the magnitude; and
output information regarding the identified action outside of the norm.

62. The system of claim 61, wherein the first sampled wave series representation comprises an alternating sine-cosine series representation and the second sampled wave representation comprises a second alternating sine-cosine series representation.

63. The system of claim 61 wherein each of the first and second wave series transformations comprises an Andrews' wave transformation.

64. The system of claim 61 wherein the data processing instructions for configuring the one or more data processors to filter the first sampled wave series representation and the second sampled wave series representation comprise data processing instructions for configuring the one or more data processors to:
perform a whitening operation on the first sampled wave series representation and on the second sampled wave series representation.

65. The system of claim 64 wherein the data processing instructions for configuring the one or more data processors to perform a whitening operation on the first sampled wave series representation and on the second sampled wave series representation comprise data processing instructions for configuring the one or more data processors to:
remove autoregressive affects; and
remove moving average affects.

66. The system of claim 64 wherein the data processing instructions for configuring the one or more data processors to filter the first sampled wave series representation and the second sampled wave series representation comprise data processing instructions for configuring the one or more data processors to:
compare the whitened first sampled wave series representation and the whitened second sampled wave series representation.

67. The system of claim 66 wherein the data processing instructions for configuring the one or more data processors to compare the whitened first sampled wave series representation and the whitened second sampled wave series representation comprise data processing instructions for configuring the one or more data processors to:
determine a cross-correlation function between the whitened first sampled wave series representation and the whitened second sampled wave series representation; and
identify the deviation in the phase or the magnitude when a value of the determined cross-correlation function exceeds a threshold level.

68. The system of claim 61, wherein the state vector for an actor is stored in a state vector data structure and wherein the population state vector is stored in a population state data structure.

69. The system of claim 68, wherein the population state data structure includes a record for each of the plurality of actors in the population including the actor.

70. The system of claim 69, wherein the record for the actor includes a field for each of the plurality of categories for storage of the characteristic of the actor in each of the plurality of categories.

71. A computer-program product for performing data mining operations on data, the computer-program product tangibly embodied in a machine-readable non-transitory storage medium and including instructions configured to cause a data processing apparatus to:
transform a state vector for an actor into a first sampled wave series representation, wherein the state vector identifies a characteristic for the actor in each of a plurality of categories;
define a population that includes a plurality of actors;
transform a state vector for the defined population into a second sampled wave series representation, wherein the defined population state vector identifies a characteristic for the population, wherein the second sampled wave series representation is a single wave series representation for the plurality of actors;
compare the first sampled wave series representation and the second sampled wave series representation to identify a deviation of the first wave series representation from the second wave series representation in a phase or a magnitude;
identify an action outside of a norm based on the identified deviation in the phase or in the magnitude; and
output information regarding the identified action outside of the norm.

72. The computer-program product of claim 71, wherein each of the plurality of categories comprises a specific procedure.

73. The computer-program product of claim 72, wherein the characteristic for the actor comprises a utilization percentage of a procedure.

74. The computer-program product of claim 71, wherein the instructions configured to cause a data processing apparatus to transform a state vector for an actor into a first sampled wave series representation comprise applying an Andrews' wave transformation to transform the actor state vector into the first sampled wave series representation.

75. The computer-program product of claim 74, wherein the instructions configured to cause a data processing apparatus to transform a state vector for the defined population into a second sampled wave series representation comprise applying an Andrews' wave transformation to transform the defined population state vector into the second sampled wave series representation.

76. The computer-program product of claim 71, wherein the first sampled wave series representation comprises an alternating sine-cosine series representation.

77. The computer-program product of claim 76, wherein the second sampled wave representation comprises a second alternating sine-cosine series representation.

78. The computer-program product of claim 71, further comprising instructions configured to cause a data processing apparatus to whiten the first sampled wave series representation and the second sample wave series representation to generate a whitened first sampled wave representation and a whitened second sampled wave representation.

79. The computer-program product of claim 78, wherein the instructions configured to cause a data processing apparatus to compare the first sampled wave representation and the second sampled wave representation comparing the whitened first sampled wave representation to the whitened second sampled wave representation.

80. The computer-program product of claim 78, wherein the instructions configured to cause a data processing apparatus to whiten comprise instructions configured to cause a data processing apparatus to filter the whitened first sampled wave representation and the whitened second sampled wave representation to remove autoregressive and moving average affects.

81. A computer-program product for performing data mining operations on data, the computer-program product tangibly embodied in a machine-readable non-transitory storage medium and including instructions configured to cause a data processing apparatus to:
perform a whitening operation on a sampled wave series representation of a state vector for an actor, wherein the actor state vector identifies a characteristic for the actor in each of a plurality of categories;

perform a whitening operation on a sampled wave series representation of a state vector for a population, wherein the population state vector identifies the characteristic for the population in the plurality of categories;

determine a cross-correlation function between the whitened actor series representation and the whitened population series representation;

identify a deviation in a phase or a magnitude when a value of the determined cross-correlation function exceeds a threshold level;

identify an action outside of a norm based on the identified deviation in the phase or in the magnitude; and output information regarding the identified action outside of the norm.

82. The computer-program product of claim 81 wherein the instructions configured to cause a data processing apparatus to perform a whitening operation on a sampled wave series representation of a state vector for an actor and on a sampled wave series representation of a state vector for a population comprise instructions configured to cause a data processing apparatus to:

remove autoregressive affects; and remove moving average affects.

83. The computer-program product of claim 81, wherein the sampled wave series representation of the state vector for the actor comprises an alternating sine-cosine series representation and the sampled wave series representation of the state vector for the population comprises a second alternating sine-cosine series representation.

84. The computer-program product of claim 81 further comprising instructions configured to cause a data processing apparatus to generate the sampled wave series representation of the state vector for the actor using a first wave series transformation.

85. The computer-program product of claim 84 wherein the first wave series transformation comprises an Andrews' wave transformation.

86. The computer-program product of claim 81 further comprising instructions configured to cause a data processing apparatus to generate the sampled wave series representation of the state vector for the population using a second wave series transformation.

87. The computer-program product of claim 86 wherein the second wave series transformation comprises an Andrews' wave transformation.

88. The computer-program product of claim 81, wherein the deviation in the phase represents a distribution of actions across the categories for the actor that differs more than a threshold amount from a distribution of actions for the population.

89. The computer-program product of claim 81, wherein the deviation in the magnitude represents a volume of actions in a particular category for the actor that differs by more than a threshold amount from the volume of actions that fall in the particular category for the population.

90. The computer-program product of claim 89, wherein the threshold amount is based on a confidence interval associated with the whitened population series representation.

91. A computer-program product for performing data mining operations on data, the computer-program product tangibly embodied in a machine-readable non-transitory storage medium and including instructions configured to cause a data processing apparatus to:

define a population that includes a plurality of actors;

generate an actor state vector and a population state vector, wherein the actor state vector identifies a characteristic for an actor in each of a plurality of categories and the population state vector identifies a characteristic for the defined population in each of the plurality of categories;

transform the actor state vector into a first sampled wave series representation using a first wave series transformation;

transform the population state vector into a second sampled wave series representation using a second wave series transformation, wherein the second sampled wave series representation is a single wave series representation for the plurality of actors;

filter the first sampled wave series representation and the second sampled wave series representation to identify a deviation of the first wave series representation from the second wave series representation in a phase or a magnitude;

identify an action outside of a norm based on the identified deviation in the phase or in the magnitude; and output information regarding the identified action outside of the norm.

92. The computer-program product of claim 91, wherein the first sampled wave series representation comprises an alternating sine-cosine series representation and the second sampled wave representation comprises a second alternating sine-cosine series representation.

93. The computer-program product of claim 91 wherein each of the first and second wave series transformations comprises an Andrews' wave transformation.

94. The computer-program product of claim 91 wherein the instructions configured to cause a data processing apparatus to filter the first sampled wave series representation and the second sampled wave series representation comprise instructions configured to cause a data processing apparatus to:

perform a whitening operation on the first sampled wave series representation and on the second sampled wave series representation.

95. The computer-program product of claim 94 wherein the instructions configured to cause a data processing apparatus to perform a whitening operation on the first sampled wave series representation and on the second sampled wave series representation comprise instructions configured to cause a data processing apparatus to:

remove autoregressive affects; and remove moving average affects.

96. The computer-program product of claim 94 wherein the instructions configured to cause a data processing apparatus to filter the first sampled wave series representation and the second sampled wave series representation comprise instructions configured to cause a data processing apparatus to:

compare the whitened first sampled wave series representation and the whitened second sampled wave series representation.

97. The computer-program product of claim 96 wherein the instructions configured to cause a data processing apparatus to compare the whitened first sampled wave series representation and the whitened second sampled wave series representation comprise instructions configured to cause a data processing apparatus to:

determine a cross-correlation function between the whitened first sampled wave series representation and the whitened second sampled wave series representation; and identify the deviation in the phase or the magnitude when a value of the determined cross-correlation function exceeds a threshold level.

98. The computer-program product of claim 91, further comprising instructions configured to cause a data processing apparatus to store the state vector for an actor in a state vector data structure and the population state vector in a population state data structure.

99. The computer-program product of claim 98, wherein the population state data structure includes a record for each of the plurality of actors in the population including the actor.

100. The computer-program product of claim 99, wherein the record for the actor includes a field for each of the plurality of categories and the fields are for storage of the characteristic of the actor in each of the plurality of categories.

* * * * *